Aug. 28, 1951   N. C. CHRISTENSEN   2,565,718
LIQUID ROTOR SPRAY MECHANISM
Filed July 30, 1948   2 Sheets-Sheet 1
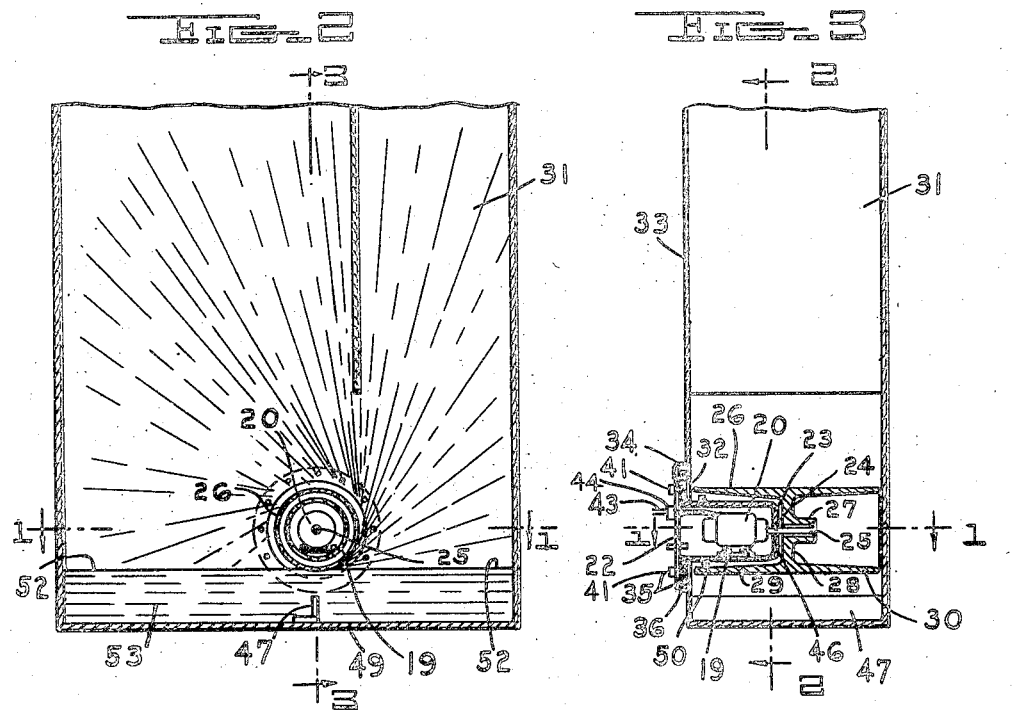
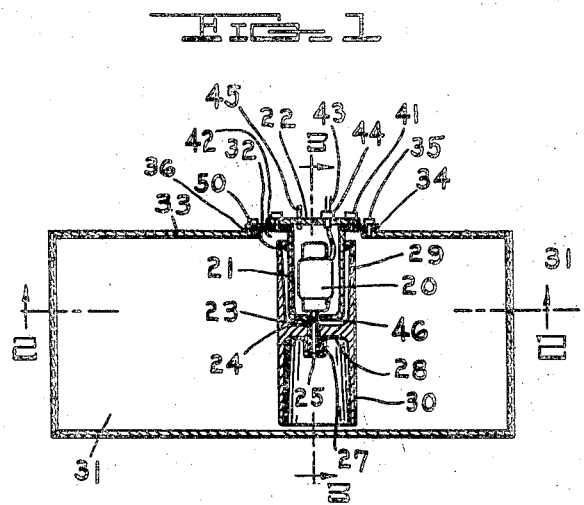
INVENTOR
NIELS C. CHRISTENSEN
Burton & Parker
ATTORNEYS

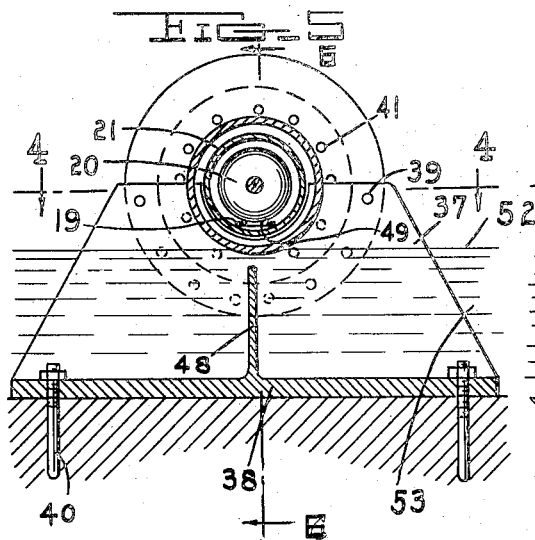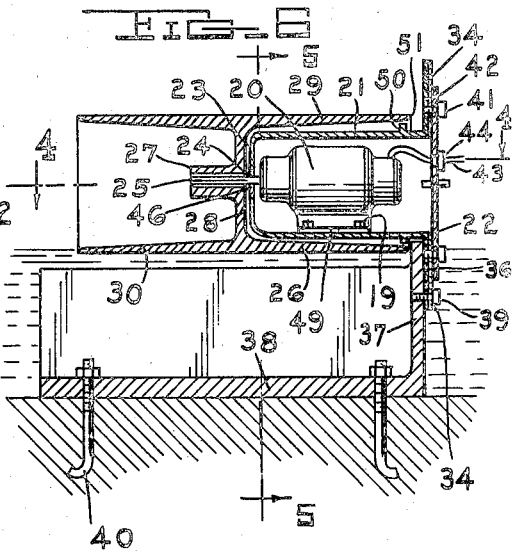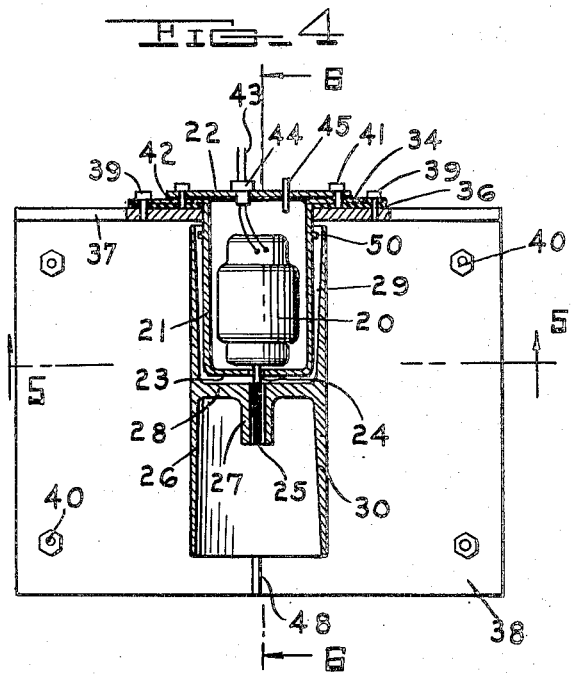

Patented Aug. 28, 1951

2,565,718

UNITED STATES PATENT OFFICE 2,565,718

LIQUID ROTOR SPRAY MECHANISM

Niels C. Christensen, Bauer, Utah

Application July 30, 1948, Serial No. 41,593

3 Claims. (Cl. 299—63)

This invention relates to improved liquid rotor spray mechanism.

In apparatus for making a spray from liquids or pulps by the rapid rotation of a rotor dipping into a body of liquid to be sprayed, such as herein described, and such as illustrated in my Patent 1,462,363 or Dalton Patent 2,243,839, it is desirable to simplify the manufacture and installation, and to secure the maximum mechanical efficiency, smoothness and uniformity of operation.

It is an object of this invention to secure those features which are essential to the most efficient operation of the spray rotor and to eliminate those features which militate against simplicity of design and construction of the complete installation in which the spraying device is used.

Among the major difficulties encountered in installations of spray rotors are the following: (1) securing a balanced rotor; (2) preventing surging of the liquid; (3) keeping the sprayed liquid out of the bearing supporting the rotor, and out of contact with the motor and driving mechanism; (4) prevention of leakage from packing glands; (5) excessive floor space required by driving mechanism; (6) obstruction of gas inlet and outlet by the driving mechanism and gland connections; (7) obstruction of solution inflow and level control outflow by driving mechanism and glands for rotor shaft; (8) difficulty of inserting and of removing rotors; (9) loss of power in packing glands and belts used in enclosed or housed installations. These difficulties are minimized by the use of the simple, self-contained, rotor spray unit of this invention.

The spray rotors in use commonly consist of a cylinder connected directly to an electric motor through a flexible coupling, or by a belt from a motor pulley. At peripheral speeds commonly used (1500 to 4000 feet per minute) with rotors of the size commonly used (12″ to 15″ in diameter and 4 ft. to 6 ft. long) it is difficult to secure a balanced rotor and the pounding of an unbalanced rotor causes heating and wear of the bearings and glands. Under certain conditions it may cause sufficient surging of the liquid in the container to give irregular spraying instead of the constant and uniform spray required for efficient operation.

In open pond installations it is quite difficult, with the commonly used type of rotor and drive, to prevent sprayed liquid from reaching the motor, drive belts, and bearings, which must be suitably housed and protected. In housed installations, the rotor shaft must pass through packing glands in the housing and packing glands in a spray housing require constant attention to prevent leakage and serious loss of power. In conventional installations the driving mechanism takes up considerable floor space and must be well-covered to protect against accidents. Such constructions are a hindrance to neat and compact design.

An object of this invention is to provide a self-contained unit which may be readily installed either in an open pond installation or housed within a cabinet with a minimum of labor and expense and which will function smoothly and with constant uniformity to maintain the highest efficiency of the rotor.

A further object is to provide a gas washer of the rotor spray type wherein the electric motor employed to drive the rotor is supported within the boundary of the casing and the rotor surrounds the motor.

More particularly an object is to provide an easily assembled and simple spray rotor which surrounds the motor that drives the rotor and is supported for rotation by such motor.

The motor which drives the spray rotor is enclosed by the spray rotor and a housing so that it is completely protected from the liquid being sprayed. The rotor consists of a hollow cylinder with a transverse web having a central hub through which one end of the motor shaft extends and by which it is attached to the spray rotor. The housing or extension of the supporting member completely encloses the motor and extends into the space enclosed by the spray rotor. The motor shaft is connected with the web of the spray rotor to drive the rotor thereby forming a simple compact motor driven spray rotor unit which may be installed as a unit in a spray chamber or may be installed as a unit for spraying from open ponds.

Other objects, advantages and meritorious features will more fully appear from the following description, claims and accompanying drawings, wherein:

Figs. 1, 2 and 3 show the invention as installed for spraying within a spray chamber.

Fig. 1 is a plan view partly in section on lines 1—1 of Figs. 2 and 3. Fig. 2 is a vertical section on lines 2—2 of Figs. 1 and 3. Fig. 3 is a vertical section on lines 3—3 of Figs. 1 and 2.

Figs. 4, 5 and 6 show the invention as installed for spraying in open ponds.

Fig. 4 is a plan view partly in section on lines 4—4 of Figs. 5 and 6. Fig. 5 is a vertical section on lines 5—5 of Figs. 4 and 6. Fig. 6 is a vertical section on lines 6—6 of Figs. 4 and 5.

This application is a division and continuation in part of my application, Serial No. 563,257, Filed November 13, 1944, U. S. Patent No. 2,488,297, dated August 31, 1948.

The spraying unit consists of a motor 20 secured within a cup-shaped housing or shell 21 by bolts 19. The open end of this housing is completely closed by a removable cover plate 22. The opposite end of the housing is closed by a fixed end plate 23. This end 23 is provided with a hole 24 through which the shaft 25 of the motor extends.

A spray rotor 26 has its hub 27, which hub is formed centrally on a solid web 28, of the rotor, keyed to the end of the motor shaft 25 to rotate therewith. The rotor is formed to exhibit a hollow cylindrical portion 29 which extends from the web 28 so as to enclose the motor housing 21. If a wide rotor is desired the cylindrical portion of the rotor may be extended in the opposite direction from the web 28 forming an extended portion 30.

In those cases in which the spray unit is used in a spray chamber, as illustrated in Figs. 1 to 3 inclusive, the spray unit described is inserted into the spray chamber 31 through a suitable hole 32 in the side 33 of the spray chamber housing. This unit assembly is fastened to the chamber wall by means of an extended annular web 34 of the motor housing 21 with bolts 35. An annular watertight gasket 36 is disposed between the web 34 and the side wall 33 of the spray chamber.

In those cases in which the spray unit is installed in an open pond or canal (Figs. 4, 5 and 6), a spray unit assembly constructed as described is attached to an upward extension 37 of a supporting base 38 by means of annular web 34 and bolts 39. The supporting base 38 extends under the spray unit and may be attached to the floor of the basin or pond by bolts 40 or if made heavy enough may merely rest on the bottom of the basin.

The removable cover plate 22, in both cases, is attached to the annular web 34 by the bolts 41 with a suitable annular watertight gasket 42 disposed between the outer portion of the plate 22 and the web 34.

The electrical wires 43 which extend from a source of electric power to the motor pass through a sealed or watertight plug 44 in the cover plate 22. Air may be supplied to the space inside the motor housing through an inlet pipe 45 which may pass out through the narrow annular space 46 between the motor shaft 25 and the edge of the hole 24 in the end 23 of the housing 21 so as to keep any vapors from entering the housing through the opening 24.

A suitable narrow baffle 47 (Figs. 2 and 3) extends upward from the floor of the spray chamber nearly to the lowermost portion of the rotor 26 directly beneath and parallel to the axis of the rotor to prevent surging of liquid in contact with the rotor. A similar baffle 48 may extend upward from the base 38 beneath the rotor 26 for use in open ponds or basins.

The invention is assembled as a complete self-contained unit by inserting and securing the motor 20 within the housing 21 and attaching it to the base plate 49 therein, fastening the spray rotor on the extension 25 of the motor shaft, which passes through the hole 24 in the end plate 23 and bolting the cover plate 22 in place.

The complete unit is then ready for installation into a spray chamber 31 by insertion through the hole 32 on the wall 33 of the chamber and fastening in place by means of annular web 34 and bolts 35. For installation in the open, i. e. for spraying in ponds or channels, the complete unit is put into place in the semi-circular cradle-like upward extension 37 of the supporting base 38 and fastened thereto by means of the web 34 and bolts 35.

To keep any spray or liquid from entering the narrow annular space between the cylinder 29 and the housing 21 the housing is supplied with a shallow ring 50 extending outward from the housing nearly to the inner face of the rotor near the edge 51 of the rotor. The inner face of the rotor is made slightly greater in diameter at the open end than near the web 28 so that any liquid entering the cylinder 29 is discharged at the outer edge by centrifugal action during rotation of the rotor and as aided by air flowing outwardly from the interior of the housing.

As noted in co-pending application, Serial No. 563,257, now Patent No. 2,448,297, and in my Patent 1,462,363, suitable provision must be made with this type of spray unit to maintain a substantially constant liquid level 52 so that the lower part of the rotor 26 dips only slightly into the liquid to be sprayed, the exact dipping depth used depending upon the type and volume of spray desired. The dipping depth with a 12″ diameter rotor may vary from $\frac{1}{16}$″ to $\frac{3}{8}$″. With the smaller dipping depth a finer spray is thrown than with the greater dipping depth and a coarse spray is thrown with the larger dipping depths from $\frac{1}{4}$″ to $\frac{3}{8}$″. As also described in the above-mentioned patent and application, the type and volume of spray also varies with the peripheral speed of the rotor 26. For example, with a 12″ diameter rotor revolving at 600 R. P. M. with a dipping depth of $\frac{1}{4}$″ a coarse spray of considerably smaller volume is thrown as compared with the finer spray of greater volume thrown when the rotor is operating at 1000 R. P. M. As the speed of such a rotor is increased to 1200 or 1800 R. P. M., the volume of spray increases but the spray becomes much finer. Rotors of different sizes varying from 3″ to 18″ or 24″ may be used depending upon the size of the installation and the volume of spray desired. With rotors of small diameter much more accurate regulation of the dipping depth is required for efficient operation than with larger diameter rotors from 12″ to 18″.

As noted in the previously mentioned patent and application this spray unit may easily be made corrosion proof by making the rotor 26 and housing of suitable corrosion proof material.

A sump 53 (Figs. 2 and 3) with suitable means for maintaining a constant level of solution 52 is provided within the spray chamber. Such liquid level must also be maintained in the pond to insure efficient operation of the unit.

From the foregoing description it will be apparent that this simple, compact, self-contained unit avoids many of the difficulties of design, construction and operation hereinabove enumerated and which are present with externally-driven rotor sprays using external shafts, bearings, pulleys, belts and motors, and requiring glands and other protective devices in the spray housings. It will also be apparent that such a unit may be installed with a minimum of difficulty in design or arrangement in any type of housing or general arrangement since no special provisions for driving the rotor are required and no obstruction to the most efficient flow of gases and liquid is offered by the unit making possible the simplest and most efficient design and construction of installations in which the invention is used. For these reasons it is also especially well suited for use in old arrangements and installations already constructed, since it may readily be dropped into place without special provisions for driving shafts, motors, pulleys, belts, glands, etc., and with a minimum of disturbance of the original design or construction.

Having described my invention, what I claim and desire to patent is:

1. A liquid spray unit comprising, in combination, a cup-shaped housing, an electric motor mounted within the housing, the closed end of the cup-shaped housing provided with an opening aligned with the motor shaft, said shaft extending rotatably through said opening, an end plate removably closing the opposite end of the housing, said housing provided at its opposite end with a radially projecting flange, a cylindrical rotor open at one end having a transverse solid web spaced from such end, the open end of the rotor surrounding the housing with the transverse web of the rotor disposed adjacent to the closed end of the housing, said web having an axial hub coupled with the motor shaft whereby the rotor rotates with the shaft, a liquid containing reservoir having an upright portion, means securing the flange of the housing to said upright portion supporting the rotor and motor housing projecting horizontally across the reservoir.

2. A liquid spray unit comprising, in combination, a cup-shaped housing, an electric motor mounted within the housing, the closed end of the cup-shaped housing provided with an opening aligned with motor shaft, said shaft extending rotatably through said opening, an end plate removably closing the opposite end of the housing, said housing provided at its opposite end with a radially projecting flange, a cylindrical rotor open at one end and having a transverse solid web spaced from such end, the open end of the rotor surrounding the housing with the transverse web of the rotor disposed adjacent to the closed end of the housing, said web having an axial hub coupled with the motor shaft whereby the rotor rotates with the shaft, an upright spray chamber the bottom of which serves as a liquid containing reservoir, one upright wall of the chamber having an opening of sufficient size to pass the rotor therethrough, means securing the flange of the motor housing to said wall about said opening supporting the rotor to project horizontally from the wall into the chamber transversely across the liquid containing reservoir portion thereof, said motor housing flange having a diameter in excess of the diameter of the rotor.

3. A liquid spray unit comprising, in combination, a cup-shaped housing, an electric motor mounted within the housing, the closed end of the cup-shaped housing provided with an opening aligned with the motor shaft, said shaft extending rotatably through said opening, an end plate removably closing the opposite end of the housing, said housing provided at said opposite end with a radially projecting flange, a cylindrical rotor open at one end and having a transverse solid web spaced from such end, the open end of the rotor surrounding the housing with the transverse web of the rotor disposed adjacent to the closed end of the housing, said web having an axial hub coupled with the motor shaft whereby the rotor rotates with the shaft, the open end of the rotor surrounding the housing being internally tapered outwardly from the web toward its outer end, said housing provided with a radially projecting circumferential rib disposed within the rotor and adjacent to the open end thereof.

NIELS C. CHRISTENSEN.

REFERENCES CITED

The following references are of record in the file of this patent:

UNITED STATES PATENTS

| Number | Name | Date |
| --- | --- | --- |
| 2,071,410 | Kuhn et al. | Feb. 23, 1937 |
| 2,075,034 | Grace et al. | Mar. 30, 1937 |
| 2,215,753 | Goodman et al. | Sept. 24, 1940 |
| 2,448,297 | Christensen | Aug. 31, 1948 |